(12) United States Patent
Ehrlich

(10) Patent No.: US 7,069,702 B2
(45) Date of Patent: Jul. 4, 2006

(54) COMPOSITE JOINT CONFIGURATION

(75) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 11/248,875

(22) Filed: Oct. 13, 2005

(65) Prior Publication Data
US 2006/0028050 A1 Feb. 9, 2006

Related U.S. Application Data

(60) Continuation of application No. 10/858,119, filed on Jun. 1, 2004, now Pat. No. 6,986,546, which is a continuation of application No. 10/120,096, filed on Apr. 10, 2002, now abandoned, which is a continuation of application No. 09/802,311, filed on Mar. 8, 2001, now Pat. No. 6,412,854, which is a division of application No. 09/108,536, filed on Jul. 1, 1998, now Pat. No. 6,220,651, which is a continuation-in-part of application No. 08/712,770, filed on Sep. 12, 1996, now Pat. No. 5,860,693.

(51) Int. Cl.
    *B62D 33/023* (2006.01)
(52) U.S. Cl. .................. 52/588.1; 296/186.1; 296/191
(58) Field of Classification Search ............ 296/186.1, 296/191; 52/584.1, 588.1
    See application file for complete search history.

(56) References Cited

U.S. PATENT DOCUMENTS

| 2,080,005 A | 5/1937 | Gilpin |
| 2,123,441 A | 7/1938 | Schlesinger |
| 3,102,498 A | 9/1963 | Dean |
| 3,386,218 A | 6/1968 | Scott |
| 4,043,274 A | 8/1977 | Snyder |
| 4,045,927 A | 9/1977 | Diaz |
| 4,104,840 A * | 8/1978 | Heintz et al. .............. 52/309.9 |
| 4,656,809 A | 4/1987 | Wilson |
| 4,703,948 A | 11/1987 | Ehrlich |
| 4,750,859 A | 6/1988 | Oren et al. |
| 4,810,027 A | 3/1989 | Ehrlich |
| 4,904,017 A | 2/1990 | Ehrlich |
| 4,936,069 A | 6/1990 | Hunter et al. |
| 4,940,279 A * | 7/1990 | Abott et al. ............. 296/186.1 |
| 4,958,472 A * | 9/1990 | Ehrlich ........................ 52/578 |
| 5,014,476 A | 5/1991 | Leslie et al. |
| 5,022,208 A | 6/1991 | Ehrat et al. |
| 5,042,395 A | 8/1991 | Wackerle et al. |
| 5,066,066 A | 11/1991 | Yurgevich et al. |
| 5,112,099 A | 5/1992 | Yurgevich et al. |
| 5,140,913 A | 8/1992 | Takeichi et al. |
| 5,285,609 A | 2/1994 | Goad |
| 5,433,053 A | 7/1995 | Tulloch |
| 5,507,405 A | 4/1996 | Thomas et al. |

(Continued)

FOREIGN PATENT DOCUMENTS

CA          772852      12/1967

(Continued)

*Primary Examiner*—Dennis H. Pedder
(74) *Attorney, Agent, or Firm*—Trexler, Bushnell, Giangiorgi, Blackstone & Marr, Ltd.

(57) ABSTRACT

A sidewall of a trailer is formed from at least two composite panels joined together by a novel joining configuration. Each panel is formed from inner and outer thin metal skins and a plastic core sandwiched between the skins. A logistics plate and overlapping outer skins of the panels are used to join the panels together and are secured thereto by rivets.

18 Claims, 8 Drawing Sheets

U.S. PATENT DOCUMENTS

| | | | |
|---|---|---|---|
| 5,584,527 A | 12/1996 | Sitter | |
| 5,628,158 A | 5/1997 | Porter | |
| 5,664,826 A * | 9/1997 | Wilkens | 296/186.1 |
| 5,673,524 A | 10/1997 | Gailey | |
| 5,774,972 A | 7/1998 | Ehrlich | |
| 5,992,117 A | 11/1999 | Schmidt | |
| 6,010,020 A | 1/2000 | Abal | |

FOREIGN PATENT DOCUMENTS

| | | |
|---|---|---|
| DE | 72564 | 4/1970 |
| DE | 143008 | 7/1980 |
| DE | 3808750 | 8/1989 |
| EP | 0607575 | 12/1993 |
| FR | 2436222 | 4/1980 |
| FR | 2574724 | 12/1984 |
| GB | 946984 | 1/1964 |
| GB | 2107258 | 4/1983 |
| GB | 2158931 | 11/1985 |
| SU | 1627443 | 2/1991 |

* cited by examiner

COMPOSITE JOINT CONFIGURATION

CROSS-REFERENCE AND INCORPORATION BY REFERENCE

This application is a Continuation of application Ser. No. 10/858,119, entitled "Composite Joint Configuration" and filed on Jun. 1, 2004 now U.S. Pat. No. 6,988,546, which, in turn, is a Continuation of Ser. No. 10/120,096, entitled "Composite Joint Configuration" and filed on Apr. 10, 2002, now abandoned, which, in turn, is a Continuation of Ser. No. 09/802,311, entitled "Composite Joint Configuration" and filed on Mar. 8, 2001, now U.S. Pat. No. 6,412,854, which in turn, is a Divisional of Ser. No. 09/108,536, entitled "Composite Joint Configuration" and filed on Jul. 1, 1998, now U.S. Pat. No. 6,220,651, which in turn, is a Continuation-in-Part of Ser. No. 08/712,770, entitled "Composite Joint Configuration" and filed on Sep. 12, 1996, now U.S. Pat. No. 5,860,693. Each of the aforementioned United States patent applications are hereby incorporated by reference.

BACKGROUND OF THE INVENTION

This invention is generally directed to a novel sidewall for a trailer body. More particularly, the invention relates to joined composite panels for trailer bodies, wherein each composite panel includes a plastic core member sandwiched between thin metal skins and joined together by novel joints.

Trailers of the general type disclosed herein include a variety of types of sidewalls. A typical well-known construction is a panel-type trailer which includes aluminum side posts. Generally, it is desirable to have a relatively thin trailer sidewall so that the total inside dimensions of the trailer body can be increased to carry the optimum amount of cargo. In addition, it is desirable to have a trailer sidewall which is lightweight.

OBJECTS AND SUMMARY OF THE INVENTION

A general object of the present invention is to provide a novel joint configuration for joining a pair of composite panels together in a trailer sidewall, wherein a plurality of such joined panels may be used to form the trailer sidewall.

An object of the present invention is to provide a novel sidewall for use in a trailer body, which sidewall is simple in design and economical to manufacture while at the same time providing maximum interior space in the trailer body.

Another object of the present invention is to provide a novel sidewall having a plurality of joined composite panels, wherein each composite panel includes a plastic core member sandwiched between thin metal skins.

A further object of the present invention is to provide a novel sidewall for use in a trailer body, which sidewall is easily attached to the roof and the floor of the trailer body.

These and other objects and features of the present invention will become more apparent from a reading of the following descriptions.

Briefly, and in accordance with the foregoing, the present invention discloses a sidewall of a trailer which is formed from at least two composite panels joined together by a novel joining configuration. Each panel is formed from inner and outer thin metal skins and a plastic core sandwiched between the skins.

In several embodiments, at least one of the skins has at least one end coined to as to compress the core between the skins to define a coined end section. A logistics plate and a splicing member are used to join the panels together and are secured thereto by rivets. The logistics plate and/or the splicing member sit against the coined end sections. The splicing member may have flat top and bottom portions to facilitate in the attachment of the panels to the top and bottom rails of the trailer.

In other embodiments, a logistics plate member is secured by rivets to the panels for joining them together. The splicing member is eliminated and instead, the outer skin of at least one panel is extended to lie behind the logistics plate.

In another embodiment, the inner skin may have rolled or formed grooves to provide a smooth transition from a logistics plate having rolled edges.

In yet other embodiments, one end of each panel has a thickness which is less than the other end of the panel. The skins at the greater thickness end of the panel freely project beyond an end of the core member. The lesser thickness end is inserted between the skins of the other panel at the greater thickness end and secured thereto by rivets. To form the lesser thickness, the end of the panel may be coined or the panel may taper from one end to the other end. An insert member, made of hard plastic or metal, may be used between the skins where the rivet is inserted in any of the embodiments to substantially prevent compression of the panels.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENTS

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 1:
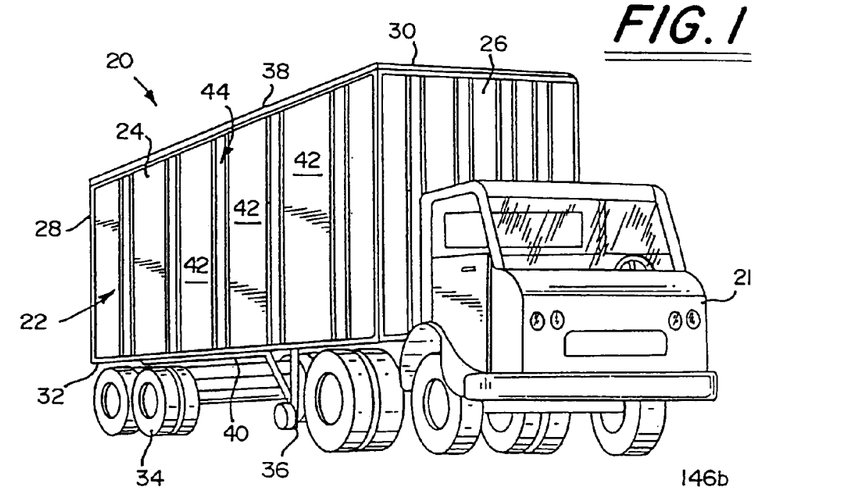
FIG. 1 is a perspective view of a trailer having a plurality of joined panels forming the sidewalls of the trailer which incorporates the features of the invention, with the trailer connected to a tractor.
Figure 14:
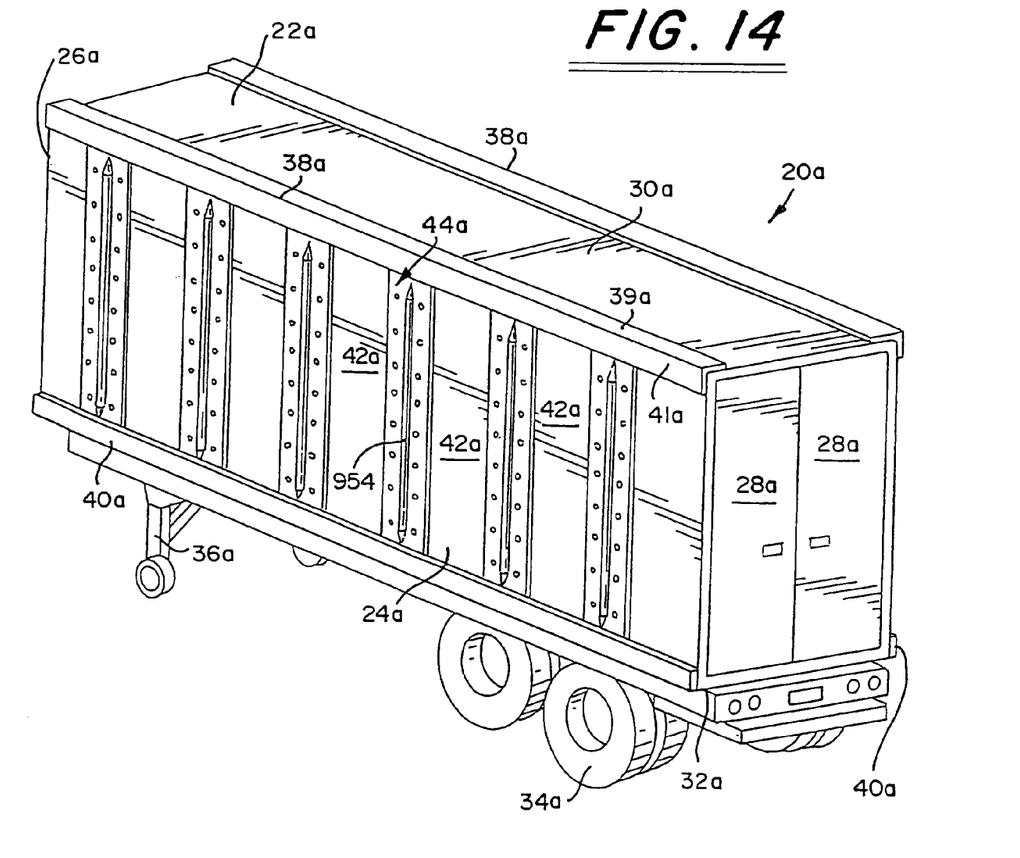
FIG. 14 is a perspective view of a trailer having a plurality of joined panels forming the sidewalls of the trailer which incorporates the features of the invention.

Turning now to the drawings, a trailer 20, 20a constructed in accordance with the present invention is shown in FIGS. 1 and 14. The trailer 20 of FIG. 1 is shown connected to a tractor 21 by conventional means, such as a fifth wheel assembly. The trailer 20a of FIG. 14 can likewise be connected to a tractor. The trailer 20, 20a includes a body 22, 22a formed from a pair of rectangular sidewalls 24, 24a, a front wall 26, 26a, rear doors 28, 28a, a top panel or roof 30, 30a and a floor 32, 32a. The floor 32, 32a is supported by a conventional rear undercarriage assembly 34, 34a and has a landing gear 36, 36a secured thereunder. The top panel 30, 30a and an upper portion of the sidewalls 24, 24a are secured to a top rail 38, 38a and the floor 32, 32a and lower portion of the sidewalls 24, 24a are secured to a bottom rail 40, 40a.

The top rail 38a, as shown in FIG. 14, is an L-shaped member having a first flat portion 39a and a second flat portion 41a. The first portion 39a is perpendicular to the second portion 41a. The first portion 39a of the top rail 38a attaches to the top panel or roof 30a while the second portion 41a of the top rail 38a attaches to the sidewalls 24a. The bottom rail 40a, as shown in FIG. 14, is of similar construction to the top rail 38a and attaches to the floor 32a and the sidewalls 24a in a similar manner as the top rail 38a attaches to the roof 30a and the sidewalls 24a. The top and bottom rails 38a, 40a maybe formed out of aluminum by an extrusion process.

Each sidewall 24, 24a includes a plurality of vertical upstanding composite side panels 42, 42a joined together by a novel joint configuration 44, 44a. Each composite side panel 42, 42a includes a plastic core member sandwiched between an inner thin metal skin and an outer thin metal skin and bonded thereto by a suitable known adhesive or other like means. One advantage of the composite panel 42, 42a used in the present invention is that it can be coined or stepped down easily by applying pressure to the area to be coined or stepped down, whereas in the prior art aluminum sidewalls, the aluminum sidewall could not be easily coined.

The inner skin and the outer skin are preferably approximately 0.026 inches thick. The skins are preferably made of aluminum; galvanized, full hardened steel, such as AISI Grade E full hard steel because of its cost effectiveness, or the like. Preferably, the outer skin is made of ASTM G90 galvanized steel and the inner skin is made of ASTM G60 galvanized steel. Aluminum may be used, but it may be too soft for some purposes and strength and punch resistance are sacrificed, however, aluminum is lightweight. Typically, each panel 42, 42a is four feet in width, but can be longer or shorter depending on the application. At least two panels are joined together by the novel joint configuration 44, 44a to form the sidewall 24, 24a of the trailer body 22, 22a.

Each core member is made of some type of compressible non-metal material, preferably thermoplastic, such as polypropylene or high density polyethylene. These materials are relatively inexpensive as compared to aluminum found in prior trailer wall constructions. In addition, because a composite panel 42, 42a is used, the weight of the trailer construction is reduced over trailers having aluminum sidewalls.

Figure 2:
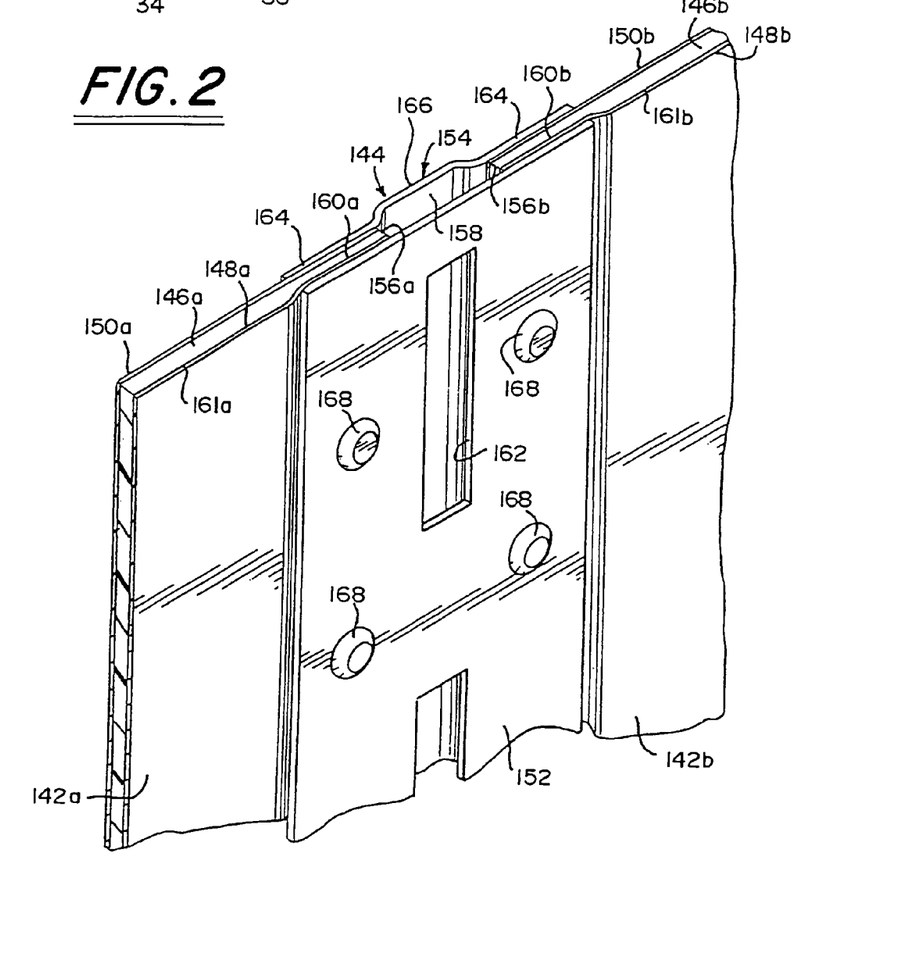
FIG. 2 is a perspective view of a pair of joined panels used in forming a sidewall of the trailer shown in FIG. 1 which incorporates the features of a first embodiment of the invention.
Figure 3:
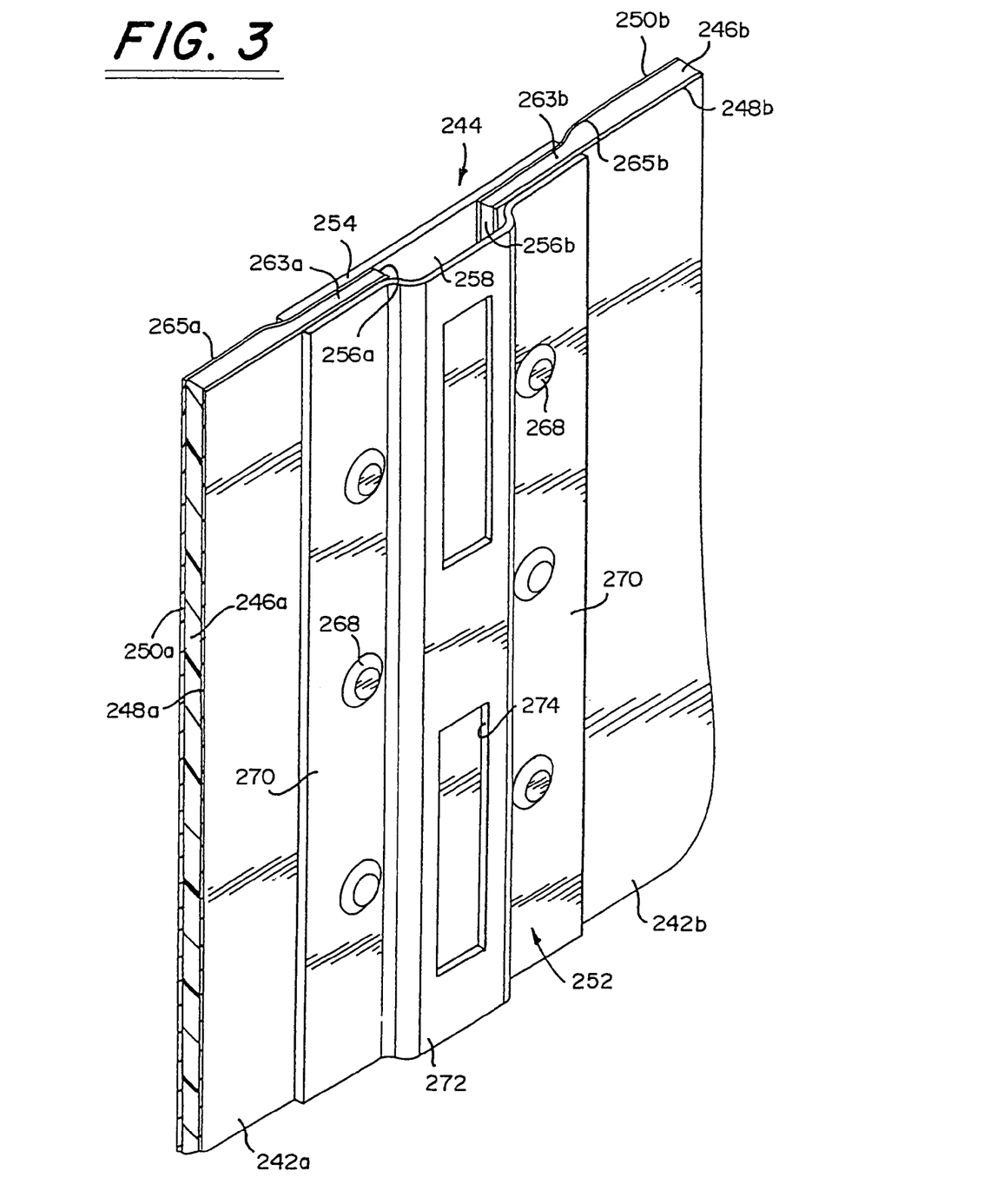
FIG. 3 is a perspective view of a pair of joined panels used in forming a sidewall of the trailer shown in FIG. 1 which incorporates the features of a second embodiment of the invention.
Figure 4:
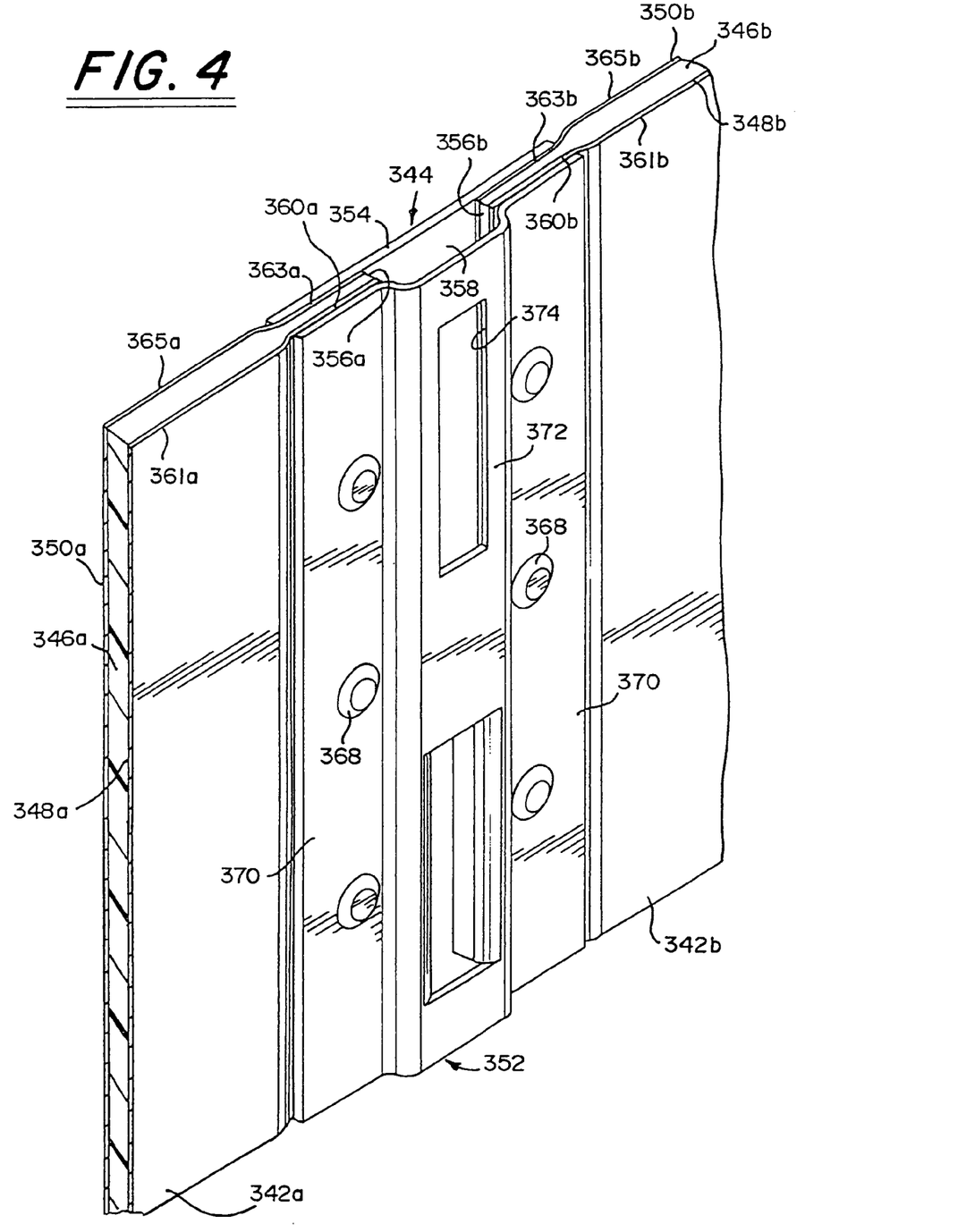
FIG. 4 is a perspective view of a pair of joined panels used in forming a sidewall of the trailer shown in FIG. 1 which incorporates the features of a third embodiment of the invention.
Figures 5, 6:
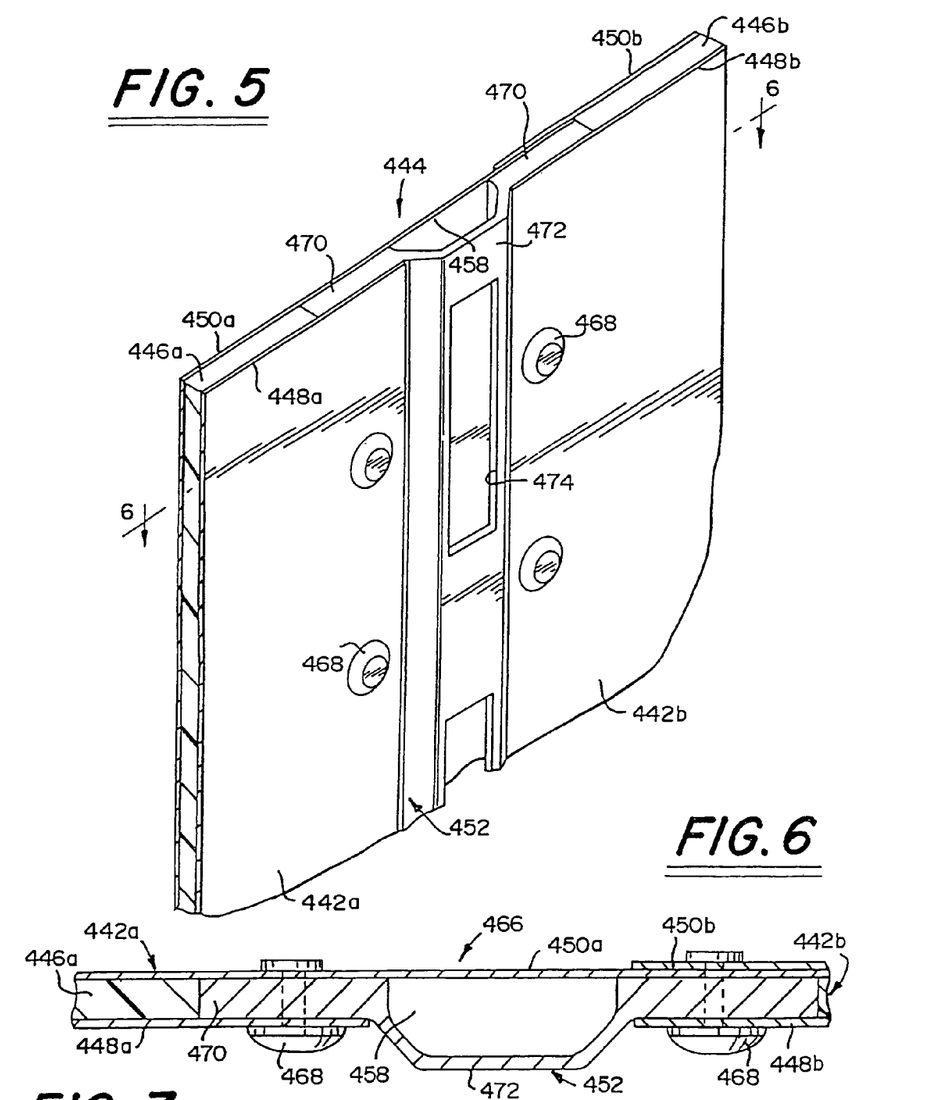
FIG. 5 is a perspective view of a pair of joined panels used in forming a sidewall of the trailer shown in FIG. 1 which incorporates the features of a fourth embodiment of the invention.
FIG. 6 is a cross-sectional view of the joined panels shown in FIG. 5 along line 6—6.
Figure 7:
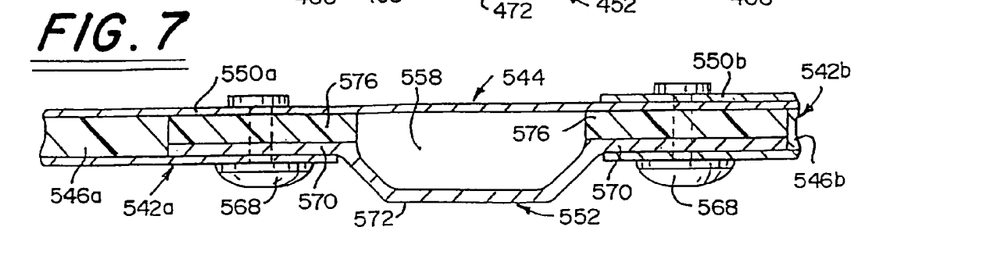
FIG. 7 is a cross-sectional view of a pair of joined panels used in forming a sidewall of the trailer shown in FIG. 1 which incorporates the features of a fifth embodiment of the invention.
Figure 8:
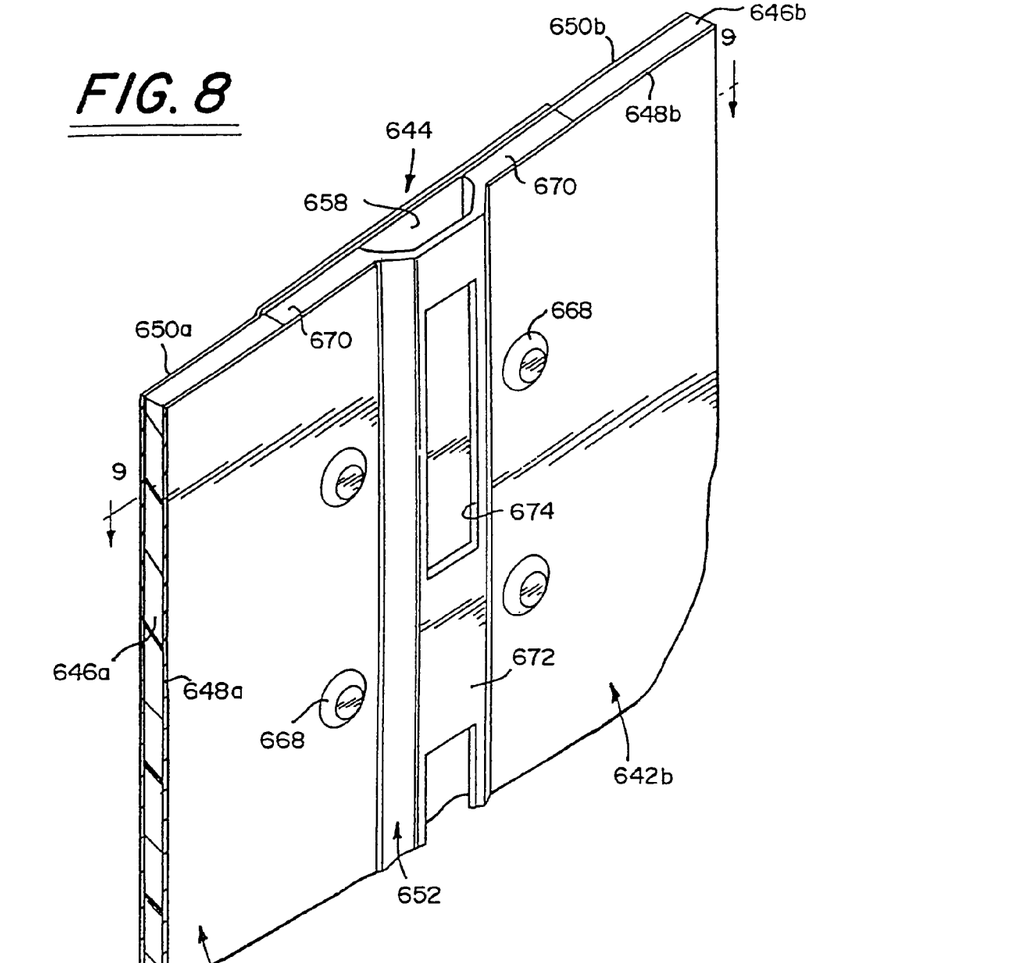
FIG. 8 is a perspective view of a pair of joined panels used in forming a sidewall of the trailer shown in FIG. 1 which incorporates the features of a sixth embodiment of the invention.
Figure 9:
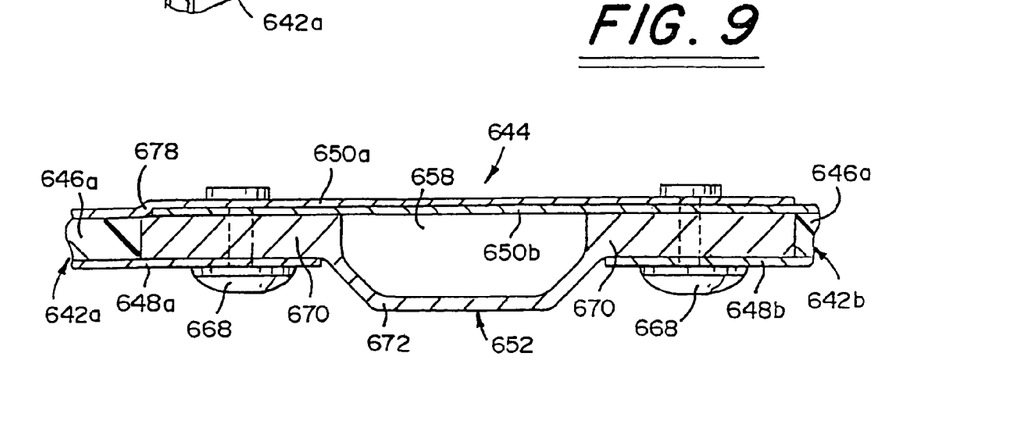
FIG. 9 is a cross-sectional view of the joined panels shown in FIG. 8 along line 9—9.
Figure 11:
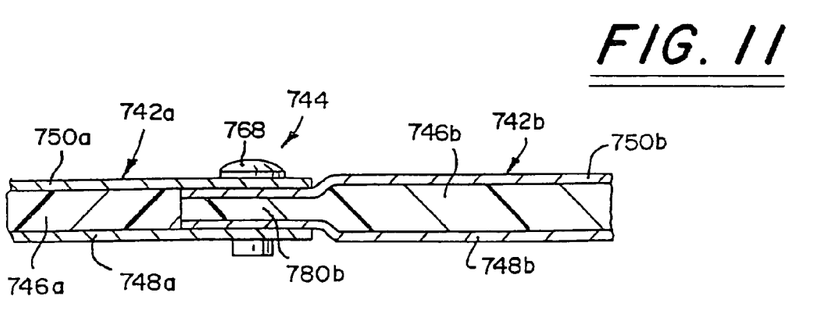
FIG. 11 is a cross-sectional view of a pair of panels shown in FIG. 10 joined together, for use in forming a sidewall of the trailer shown in FIG. 1 which incorporates the features of the seventh embodiment of the invention.
Figure 13:
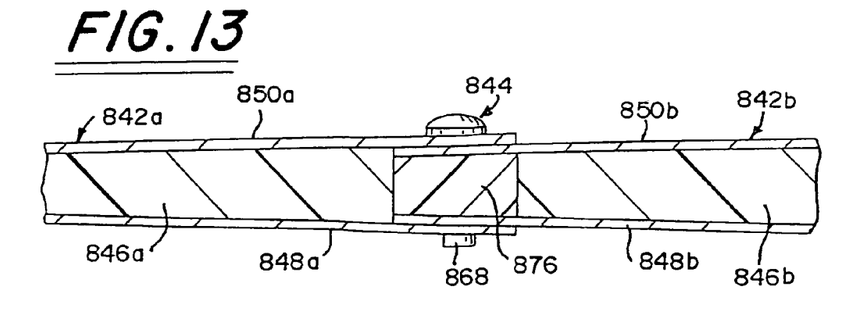
FIG. 13 is a cross-sectional view of a pair of panels shown in FIG. 12 joined together, for use in forming a sidewall of the trailer shown in FIG. 1 which incorporates the features of the eighth embodiment of the invention.
Figure 15:
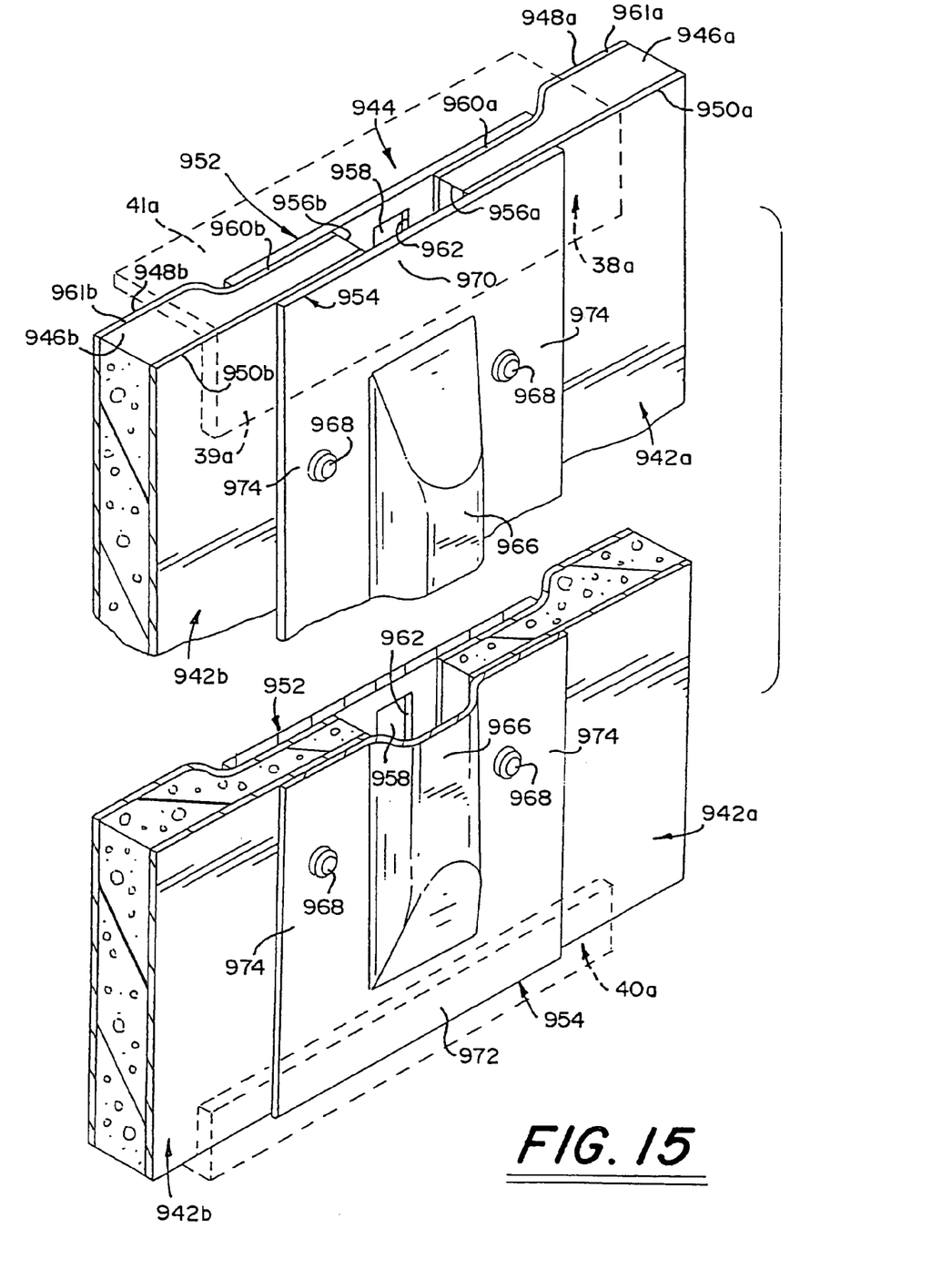
FIG. 15 is a fragmentary perspective view of a pair of joined panels used in forming a sidewall of the trailer shown in FIG. 14 which incorporates the features of a ninth embodiment of the invention.
Figure 16:
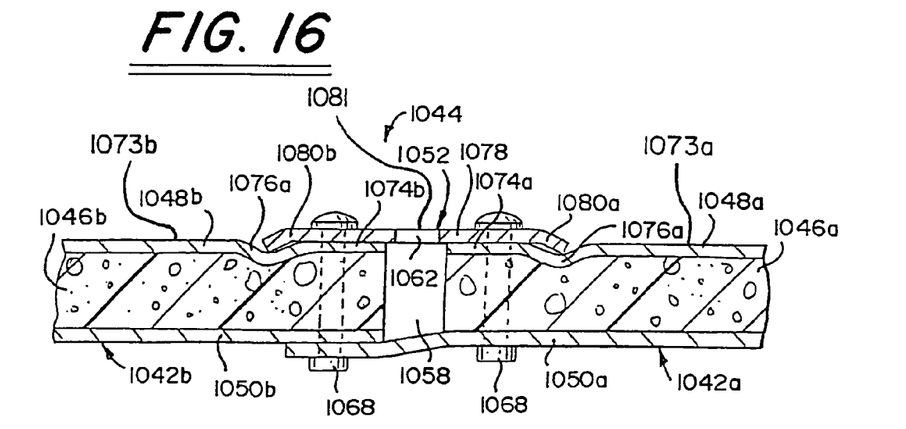
FIG. 16 is a cross-sectional view of a pair of joined panels used in forming a sidewall of the trailer shown in FIG. 1 which incorporates the features of a tenth embodiment of the invention.

Attention is now directed to the various embodiments of the novel joint configuration 44, 44a used in forming the trailer sidewalls 24, 24a as shown in FIGS. 2–13, 15–16. A first embodiment of the joint configuration 144 is shown in FIG. 2. A second embodiment of the joint configuration 244 is shown in FIG. 3; a third embodiment of the joint configuration 344 is shown in FIG. 4; a fourth embodiment of the joint configuration 444 is shown in FIGS. 5 and 6; a fifth embodiment of the joint configuration 544 is shown in FIG. 7; a sixth embodiment of the joint configuration 644 is shown in FIGS. 8 and 9; a seventh embodiment of the joint configuration 744 is shown in FIG. 11; an eighth embodiment of the joint configuration 844 is shown in FIG. 13; a ninth embodiment of the joint configuration 944 is shown in FIG. 15; and a tenth embodiment of the joint configuration 1044 is shown in FIG. 16. Like elements are denoted with like reference numerals with the first embodiment being in the one hundreds, the second embodiment being in the two hundreds, the third embodiment being in the three hundreds, the fourth embodiment being in the four hundreds, the fifth embodiment being in the five hundreds, the sixth embodiment being in the six hundreds, the seventh embodiment being in the seven hundreds, the eighth embodiment being in the eight hundreds, the ninth embodiment being in the nine hundreds and the tenth embodiment being in the ten hundreds. As shown in the drawings, only a portion of two joined panels 142a, 142b; 242a, 242b; 342a, 342b; 442a, 442b; 542a, 542b; 642a, 642b; 742a, 742b; 842a, 842b; 942a, 942b; 1042a, 1042b are shown. It is to be understood that a plurality of panels may be used to form each sidewall 124, 224, 324, 424, 524, 624, 724, 824, 924, 1024. In addition, the novel joint 144, 244, 344, 444, 544, 644, 744, 844, 944, 1044 is only shown between one end of the two panels 142a, 142b; 242a, 242b; 342a, 342b; 442a, 442b; 542a, 542b; 642a, 642b; 742a, 742b; 842a, 842b; 942a, 942b; 1042a, 1042b. It is to be understood that a like joint is provided between each adjacent end of each panel used to form the trailer sidewall.

Directing attention to the first embodiment of the novel joint configuration 144 shown in FIG. 2, first and second composite panels 142a, 142b are shown and are joined together by a logistics plate 152 on the inside of the trailer 20 which extends along the entire height of the panels 142a, 142b and by a splicing member 154 on the outside of the trailer 20 which extends along the entire height of the panels 142a, 142b. The ends 156a, 156b of the panels 142a, 142b are spaced apart from each other when joined by the logistics plate 152 and the splicing member 154 such that an air pocket 158 is formed between the logistics plate 152 and the splicing member 154.

Each end of the inner skins 148a, 148b of each panel 142a, 142b have an end section 160a, 160b (only one of which is shown on each panel 142a, 142b) which is coined or stepped down with an intermediate section 161a, 161b of each panel 142a, 142b remaining planar. The outer skin 150a, 150b of the panels 142a, 142b is not coined and remains planar. When the end section 160a, 160b of each inner skin 148a, 148b is coined, the core member 146a, 146b is squeezed or compressed between the inner and outer skins 148a, 150a; 148b, 150b and the core member 146a, 146b may slightly extrude outwardly from the ends of the skins 148a, 150a; 148b, 150b and into the air pocket 158 formed between the panels 142a, 142b.

The logistics plate 152 is a flat member having an inner surface and an outer surface and which has a plurality of spaced openings or slots 162 therethrough along an intermediate portion of the logistics plate 152. The slots 162 provide a means for which equipment can be engaged, for example by a clip or a hook, to the sidewall 24 of the trailer 20. The logistics plate 152 is preferably formed from a heavier and stronger material than the material that is used for the skins 148a, 150a; 148b, 150b to provide the sidewall with strength and rigidity. When the logistics plate 152 is joined with the inner skins 148a, 148b of the panels 142a, 142b, the outer surface of the logistics plate 152 sits against the inner surfaces of the inner end sections 160a, 160b such that the inner surface of the logistics plate 152 is flush with the inner surfaces of the intermediate sections 161a, 161b of the inner skins 148a, 148b to provide a co-planar surface along the length of the sidewall 24 in the interior of the trailer 20. Because the ends of the logistics plate 152 are flush with the intermediate sections 161a, 161b of the inner skins 148a, 148b, snagging of cargo on the edges of the logistics plate 152 is substantially prevented. The logistics plate 152 bridges the gap between the panels 142a, 142b such that the slots 162 align with the air pocket 158 so that clips or hooks can be engaged with the slots 162.

The splicing member 154, which is like a post, is attached to the outer surface of the outer skins 150a, 150b and extends to clear the top and bottom rails 38, 40 of the trailer 20. The splicing member 154 has flat end portions 164 which lie against the outer surfaces of the outer skins 150a, 150b and an intermediate portion 166 which bulges outwardly from the end portions 164. When the splicing member 154 is joined with the outer surfaces of the outer skins 150a, 150b of the panels 142a, 142b, the inner surfaces of the end portions 164 lie against the planar outer skins 150a, 150b and the intermediate portion 166 bulges outwardly from the sidewall. The splicing member 154 bridges the gap formed between the panels 142a, 142b such that the bulging intermediate portion 166 aligns with the air pocket 158. Because the bulge is provided on the outside of the trailer 20, a smooth inner surface is provided within the trailer 20. This allows for more width within the inside of the trailer 20 to load freight therein.

The logistics plate 152 and splicing member 154 are attached to the first and second panels 142a, 142b by suitable means, such as rivets 168, which extend through the logistics plate 152, the respective coined sections 160a, 160b of the panels 142a, 142b and the end portions 164 of the splicing member 154. The splicing member 154 seals the junction between the panels 142a, 142b on the exterior of the trailer 20 so as to seal the interior from moisture.

Attention is now directed to the second embodiment of the novel joint configuration 244 shown in FIG. 3. In this embodiment, first and second composite panels 242a, 242b are joined together by a logistics plate 252 on the inside of the trailer 20 which extends along the entire height of the panels 242a, 242b and by a splicing member 254 on the outside of the trailer 20 which extends along the entire height of the panels 242a, 242b. The ends 256a, 256b of the panels 242a, 242b are spaced apart from each other to provide a gap therebetween when joined by the logistics plate 252 and the splicing member 254 such that an air pocket 258 is formed between the logistics plate 252 and the splicing member 254.

Each end of the outer skins 250a, 250b of each panel 242a, 242b have an end section 263a, 263b (only one of which is shown on each panel 242a, 242b) which is coined or stepped down with an intermediate section 265a, 265b of each panel 242a, 242b remaining planar. The inner skin 248a, 248b of the panels 242a, 242b is not coined and remains planar. When the end section 263a, 263b of each outer skin 250a, 250b is coined, the core member 246a, 246b is squeezed or compressed between the skins 248a, 250a; 248b, 250b and the core member 246a, 246b may slightly extrude outwardly from the ends 256a, 256b of the panels 242a, 242b and into the air pocket 258.

The logistics plate 252 acts like a post and has end portions 270 which are flat and an intermediate portion 272 which bulges inwardly from the end portions 270. The bulging intermediate portion 272 has a plurality of spaced openings or slots 274 therethrough. The slots 274 provide a means for which equipment can be engaged, for example by a clip or a hook, to the trailer sidewall. The logistics plate 252 is preferably formed from a heavier and stronger material than the material that is used for the skins 248a, 250a, 248b, 250b to provide the sidewall 24 with strength and rigidity. When the logistics plate 252 is joined with the inner skins 248a, 248b of the panels 242a, 242b, the outer surface of the end portions 270 sits against the inner surface of the inner skins 248a, 248b such that the intermediate portion 272 bulges to the inside of the trailer 20. The logistics plate 252 bridges the gap formed between the panels 242a, 242b such that the bulging intermediate portion 272 which has the slots 274 therethrough aligns with the gap.

The splicing member 254 is flat and extends to clear the top and bottom rails 38, 40 of the trailer 20. When the splicing member is joined with the outer skins 250a, 250b of the panels 242a, 242b, the inner surface of the splicing member 254 sits against the coined end sections 263a, 263b such that the outer surface of the splicing member 254 is flush with the outer surface of the respective intermediate sections 265a, 265b of the outer skins 250a, 250b to provide a co-planar surface along the length of the sidewall 24 on the outside of the trailer 20. The splicing member 254 bridges the gap formed between the panels 242a, 242b.

The logistics plate 252 and the splicing member 254 are attached to the respective first and second panels 242a, 242b by suitable means, such as rivets 268, through the end portions 270 of the logistics plate 252, the respective coined sections 263a, 263b of the panels 242a, 242b and the splicing member 254. The splicing member 254 seals the junction between the panels 242a, 242b on the exterior of the trailer 20 so as to seal the interior from moisture.

Directing attention to the third embodiment of the novel joint configuration 344 shown in FIG. 4, first and second composite panels 342a, 342b are joined together by a logistics plate 352 on the inside of the trailer 20 which extends along the entire height of the panels 342a, 342b and by a splicing member 354 on the outside of the trailer 20 which extends along the entire height of the panels 342a, 342b. The ends 356a, 356b of the panels 342a, 342b are spaced apart from each other to provide a gap therebetween when joined by the logistics plate 352 and the splicing member 354 such that an air pocket 358 is formed between the logistics plate 352 and the splicing member 354.

Each end of the inner skins 348a, 348b of each panel 342a, 342b has an end section 360a, 360b (only one of which is shown on each panel 342a, 342b) which is coined or stepped down with an intermediate section 361a, 361b of each panel 342a, 342b remaining planar. Each end of the outer skins 350a, 350b of each panel 342a, 342b have an end section 363a, 363b (only one of which is shown on each panel 342a, 342b) which is coined or stepped down with an intermediate section 365a, 365b of each panel 342a, 342b remaining planar. When the end sections 360a, 363a; 360b, 363b are coined, the respective core members 346a, 346b are squeezed or compressed between the skins 348a, 348b; 350a, 350b and may slightly extrude outwardly from the ends 356a, 356b of the panels 342a, 342b and into the air pocket 358.

The logistics plate 352 and the splicing member 354 are identical in construction to the second embodiment of the logistics plate 252 and the splicing member 254 shown and described with respect to FIG. 3. Therefore, the specifics of the construction of the logistics plate 352 and the splicing member 354 are not repeated herein and instead, the reference numerals are denoted with like numerals and are shown in the drawings.

When the logistics plate 354 is joined with the inner skins 348a, 348b of the panels 342a, 342b, the outer surfaces of the flat end portions 370 sit against the inner surfaces of the respective coined end sections 360a, 360b such that the inner surfaces of the end portions 370 are flush with the inner surfaces of the intermediate sections 361a, 361b of the inner skins 348a, 348b and the intermediate portion 372 of the logistics plate 352 bulges to the inside of the trailer 20. The ends 356a, 356b of the panels 342a, 342b are spaced apart from each other. Because the inner surfaces of the end portions 370 are flush with the inner surfaces of the intermediate sections 361a, 361b of the skins 348a, 348b, snagging of cargo on the edges of the logistics plate 352 is substantially prevented. The logistics plate 352 bridges the gap formed between the panels 342a, 342b such that the bulging intermediate portion 372, which has the openings or slots 372 therein, aligns with the air pocket 358.

When the flat splicing member 354 is joined with the outer skins 350a, 350b of the panels 342a, 342b, the inner surface of the splicing member 354 sits against the outer surfaces of the coined end sections 363a, 363b such that the outer surface of the flat splicing member 354 is flush with the outer surfaces of the intermediate sections 365a, 365b of the outer skins 350a, 350b to provide a co-planar surface along the length of the sidewall 24 on the outside of the trailer 20. The splicing member 354 bridges the gap formed between the panels 342a, 342b.

The logistics plate 352 and the splicing member 354 are attached to the respective first and second panels 342a, 342b by suitable means, such as rivets 368, through the end portions 370 of the logistics plate 352, the coined portions of the panels 342a, 342b and the splicing member 354. The splicing member 354 seals the junction between the panels 342a, 342b on the exterior of the trailer 20 so as to seal the interior from moisture.

Attention is now directed to the fourth embodiment of the novel joint configuration 444 shown in FIGS. 5 and 6. In this embodiment, first and second composite panels 442a, 442b are joined together by a logistics plate 452 on the inside of the trailer 20 which extends along the entire height of the panels 442a, 442b and the splicing member provided in the previous embodiments has been eliminated.

At one end of the first panel 442a, as shown in FIGS. 5 and 6, the outer skin 450a has a length that is substantially longer than the length of the inner skin 448a. The ends of the inner and outer skins 448a, 450a freely project beyond the end of the core member 446a so as to leave an open area between the inner and outer skins 448a, 450a at the ends of the first panel 442a. At the other end of the panel 442a (not shown), the inner and outer skins 448a, 450a freely project beyond the end of the core member 446a the same distance so as to leave an open area between the inner and outer skins 448a, 450a.

At one end of the second panel 442b, the inner and outer skins 448b, 450b are of the same length and freely project beyond the end of the core member 446b the same amount so as to leave an open area between the inner and outer skins 448b, 450b. This structure is identical to the end of panel 442a which is not shown. At the opposite end of the second panel 442b, the construction is identical to the end of the first panel 442a shown in FIGS. 5 and 6.

The logistics plate 452 is formed by extruded or formed aluminum. The logistics plate 452 has flat end portions 470 with an intermediate portion 472 that bulges inwardly therefrom. The end portions 470 are approximately the same thickness as the thickness of the core members 446a, 446b and each have a length which is approximately equal to the distance between the end of each inner skin 448a, 448b to the respective core members 446a, 446b. The bulging intermediate portion 472 has a thickness which is substantially less than the thickness of the end portions 470 and has a plurality of spaced openings or slots 474 along the length thereof.

To assemble the logistics plate 452 with the first and second panels 442a, 442b, the end portions 470 of the logistics plate 452 are inserted between the inner and outer skins 448a, 450a; 448b, 450b of the first and second panels 442a, 442b such that the ends of the end portions 470 generally abut against the ends of the core members 446a, 446b. The ends of the inner skins 448a, 448b sit adjacent to the junction between the respective end portions 470 and the bulging intermediate portion 472 of the logistics plate 452. The outer skin 450a of the first panel 442a extends behind the logistics plate 452 and lies against the outer skin 450b of the second panel 442b. The outer skin 450a may lie against outer skin 450b on the inside thereof or the outside thereof. An air pocket 458 is formed between the bulging intermediate portion 472 of the logistics plate 452 and the outer skin 450a of the first panel 442a. The slots 474 align with the air pocket 458 so that clips, hooks or the like can be attached thereto for attaching equipment to the logistics plate 452.

Rivets 468 are engaged through the respective inner skins 448a, 448b, the respective end portions 470 of the logistics plate 452, the respective outer skins 450a, 450b and the extension of the outer skin 450a.

The extension of the first panel outer skin 450a eliminates the need for the separate splicing member as used in the first, second and third embodiments. The outer skin 450a is very thin, however, and, as such, does not provide as much reinforcement as the splicing member provides. The extension of the first panel outer skin 450a seals the junction between the panels 442a, 442b on the exterior of the trailer 20 so as to seal the interior from moisture.

Directing attention to the fifth embodiment of the novel joint configuration 544 shown in FIG. 7, this embodiment is the same as the joint configuration 444 shown in the fourth embodiment except that the flat end portions 570 of the logistics plate 552 are not the same thickness as the core members 546a, 546b. Instead, the flat end portions 570 and the bulging intermediate portion 572 of the logistics plate 552 are of a substantially uniform thickness.

To fill the space between the respective end portions 570 of the logistics plate 552 and the respective outer skins 550a, 550b, an insert 576 is provided in each such space. Each insert 576 is made of high density plastic or metal and completely fills the space between the outer skin 550a, 550b and the end portion 570 of the logistics plate 552. The rivets 568 are engaged through the respective inner skins 548a, 548b, the respective end portions 570 of the logistics plate 552, the respective inserts 576 and the respective outer skins 550a, 550b. When the rivets 568 are inserted through the panels 542a, 542b, the insert 576 substantially prevents compression of the panels 542a, 542b, which can occur during the insertion of a rivet because the core member 546a, 546b is made of a compressible material.

Alternatively, the logistics plate 552 could be attached to the inner surface of the inner skins 548a, 548b with the respective inserts 576 completely filling the space between the skins 548a, 550a; 548b, 550b. In addition, the logistics plate 552 could be attached to the inner surface of the inner skins 548a, 548b, the insert 576 eliminated, and the core member 546a, 546b used to completely fill the space between the skins 548a, 550a; 548a, 550a.

Directing attention to the sixth embodiment of the novel joint configuration 644 shown in. FIGS. 8 and 9, first and second composite panels 642a, 642b are joined together by a logistics plate 652 on the inside of the trailer 20 which extends along the entire height of the panels 642a, 642b and, like the fourth and fifth embodiments, the splicing member provided in the previous embodiments has been eliminated.

At each end of the first panel 642a, the outer skin 650a has a length that is substantially longer than the length of the inner skin 648a. The ends of the inner and outer skins 648a, 650a freely project beyond the end of the core member 646a so as to leave an open area between the inner and outer skins 648a, 650a at each end of the first panel 642a.

The second panel 642b is similarly constructed to the first panel 642a. At each end of the second panel 642b, the outer skin 650b has a length that is substantially longer than the length of the inner skin 648b. The ends of the inner and outer skins 648b, 650b freely project beyond the end of the core member 646b so as to leave an open area between the inner and outer skins 648b, 650b at each end of the second panel 642b.

The logistics plate 652 is identical in construction to that described with respect to the fourth embodiment. Thus, a repetition of the construction of the logistics plate 652 is not repeated herein.

To assemble the logistics plate 652 with the first and second panels 642a, 642b, the flat end portions 670 of the logistics plate 652 are inserted between the inner and outer skins 648a, 650a; 648b, 650b of the first and second panels 642a, 642b such that the ends of the end portions 670 generally abut against the ends of the core members 646a, 646b. The ends of the inner skins 648a, 648b sit adjacent to the junction between the respective end portions 670 and the bulging intermediate portion 672 of the logistics plate 652. The outer skin 650b of the second panel 642b extends behind the logistics plate 652 and lays against the outer skin 650a of the first panel 642a. The outer skin 650a of the first panel 642a extends behind the logistics plate 652 and lies against the outer skin 650b of the second panel 642b. The outer skin 650a may lie against outer skin 650b on the inside or the outside of outer skin 650b. An air pocket 658 is formed between the bulging intermediate portion 672 of the logistics plate 652 and the outer skin 650a of the first panel 642a. The openings or slots 674 align with the air pocket 658 so that clips or the like can be attached thereto for attaching equipment to the logistics plate 652. Rivets 668 are engaged through the respective inner skins 648a, 648b, the respective end portions 670 of the logistics plate 652 and the respective outer skins 650a, 650b and the extensions of the outer skins 650a, 650b.

Because the outer skin 650a of the first panel 642a overlays the outer skin 650b of the second panel 642b, a bend 678 is provided in the outer skin 650a of the first panel 642a so that the outer skins 650a, 650b lie against each other. This forms a double thickness behind the intermediate portion 672 of the logistics plate 652 to provide more strength and rigidity than when a single thickness is used, such as that shown in the fourth and fifth embodiments. The extension of the outer skins 650a, 650b of the first and second panels 642a, 642b eliminates the need for the separate splicing member as shown in the previous embodiments. If desired, inserts, like those provided in the fifth embodiment, may be provided. The extensions of the outer skins 650a, 650b seal the junction between the panels 642a, 642b on the exterior of the trailer 20 so as to seal the interior from moisture.

In the fourth, fifth and sixth embodiments of the novel composite joint configurations 444, 544, 644, the rivets 468, 568, 668 are engaged by using the method and apparatus disclosed in co-pending U.S. patent application Ser. No. 08/620,999, entitled "Method of Punching A Composite Plate", now U.S. Pat. No. 5,774,972, which is commonly owned by the assignee herein and which disclosure is herein incorporated by reference. If desired, holes can be provided through the logistic panel 452, 552, 652 and the panels 442a, 442b; 542a, 542b; 642a, 642b.

Figure 10:
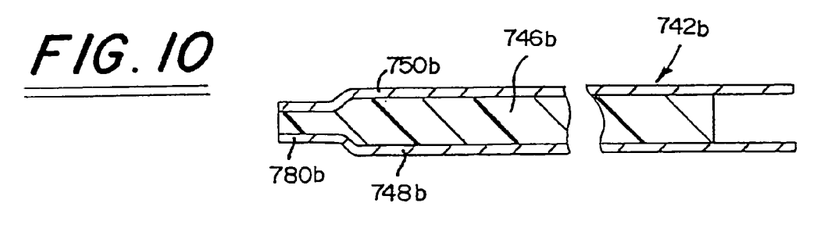
FIG. 10 is a cross-sectional view of a panel used in forming a sidewall of the trailer shown in FIG. 1 which incorporates the features of a seventh embodiment of the invention.

Attention is now directed to the seventh embodiment of the novel joint configuration 744, shown in FIG. 11, which has first and second composite panels 742a, 742b. One of the panels 742b is shown in FIG. 10. It is to be understood that the other panels used to construct the trailer sidewall are identical in construction. At one end of the panel 742b, as shown in FIG. 10, the inner and outer skins 748b, 750b are longer than its associated core member 746b so as to freely project beyond the end of the core member 746b. At the opposite end of the panel 742b, the inner and outer skins 748b, 750b are stepped down or coined so as to provide an end portion 780b which has a thickness that is less than the thickness of the remainder of the panel 742b. The edge of the core member 746b is generally flush with the end of the coined end portion 780b of the panel 742b, however, when the skins 748b, 750b are coined, some core material may extrude outwardly therefrom.

As shown in FIG. 11, to connect the panels 742a, 742b together to form a sidewall 24 of the trailer 20, the coined end portion 780b of one panel 742b is inserted between the freely projecting inner and outer skins 748a, 750a of the adjacent panel 742a. When interconnected together, the outer surface of the inner skin 748b of panel 742b lies against the inner surface of the inner skin 748a of panel 742a and the outer surface of the outer skin 750b of panel 742b lies against the inner surface of the outer skin 750a of panel 742a. When the panels 742a, 742b are joined together, because of the coined end portion 780b, the inner surfaces and outer surfaces of the panels 742a, 742b are smooth and flush along the length thereof on the inside and outside of the trailer 20. An insert, like that disclosed in the fifth embodiment, may replace the core material between the skins in the coined end portion 780b, if desired. Rivets 768 are engaged through the freely projecting ends of the inner and outer skins 748a, 750a and the coined end portion 780b.

Figure 12:
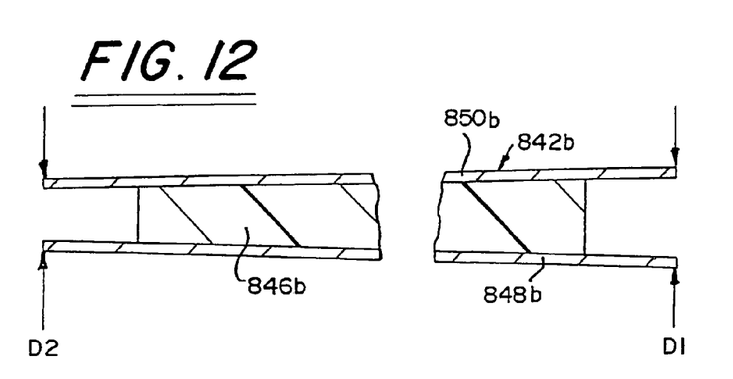
FIG. 12 is a cross-sectional view of a panel used in forming a sidewall of the trailer shown in FIG. 1 which incorporates the features of a eighth embodiment of the invention.

Attention is now directed to the eighth embodiment of the novel joint configuration 844, shown in FIG. 13, which has first and second composite panels 842a, 842b. One of the panels 842a is shown in FIG. 12. It is to be understood that the other panels used to construct the trailer sidewall 24 are identical in construction. At each end of the panel 842b, as shown in FIG. 12, the inner and outer skins 848b, 850b are longer than its associated core member 846b so as to freely project beyond the ends of the core member 846b. The panel 842b tapers from one end to the other end such that the distance D1 between the inner and outer skins 848b, 850b at one end is greater than the distance D2 between the inner and outer skins 848b, 850b at the other end. Thus, the core member 846b tapers from one end of the panel 842b to the other end of the panel 842b.

As shown in this embodiment, an insert 876, like the insert 576 in the fifth embodiment, is provided between the freely projecting skins 848b, 850b at the end of the panel 842b which has the lesser thickness. The insert 876 completely fills the space between the inner and outer skins 848b, 850b and is made of high density plastic, metal or the like. When the rivets 868 are inserted through the panels 842a, 842b, the insert 876 substantially prevents compression of the panels 842a, 842b, which can occur during the insertion of a rivet because the core member 846a, 846b is made of a compressible material. Alternatively, the insert 876 could be eliminated and the core member 846b extended to fill the space.

To connect the panels together to form a sidewall 24 the trailer 20, the smaller end of one panel 842b is inserted into the larger end of the adjacent panel 842a. When interconnected together, the outer surface of the inner skin 848b of panel 842b lies against the inner surface of the inner skin 848a of panel 842a and the outer surface of outer skin 850b of panel 842b lies against the inner surface of the outer skin 850a of panel 842a.

In the seventh and eighth embodiments of the novel joint configuration 744, 844, each rivet 768, 868 is engaged with the panels by using the method and apparatus disclosed in co-pending U.S. patent application Ser. No. 08/620,999 which disclosure has been herein incorporated by reference. During this punching process, the core material may extrude and fill any gaps between the end of the panel and the core member of the other panel. If desired, holes can be provided through the skins of the one panel and the reduced portion of the other panel through which the rivets are engaged.

Directing attention to the ninth embodiment of the novel joint configuration 944 shown in FIG. 15, this embodiment is the same as the joint configuration 144 shown in the first embodiment except that the construction of the splicing member 954 is different. It is to be understood that the splicing member 954 described with respect to this embodiment can be used on any of the embodiments in which a splicing member is provided, e.g., FIG. 5.

The splicing member 954, which is like a post, is attached to the outer surface of the outer skins 950a, 950b and is mounted under and extends between the top and bottom rails 38a, 40a of the trailer 20a. The splicing member has a flat top portion 970, a flat bottom portion 972 and flat side portions 974 which lie against the outer surfaces of the outer skins 950a, 950b, and an intermediate portion 966 which bulges outwardly from the top, bottom and side portions 970, 972, 974. When the splicing member 954 is joined with the outer surfaces of the outer skins 950a, 950b of the panels 942a, 942b, the inner surfaces of the side portions 974 lie against the planar outer skins 950a, 950b and the intermediate portion 966 bulges outwardly from the sidewall. The bulging intermediate portion 966 of the splicing member 954 bridges the air pocket 958 formed between the panels 942a, 942b and aligns with the air pocket 958. The bulging intermediate portion 966 provides for more space within the air pocket 958 to allow for the attachment of members, such as clip or hooks, to the slots 962 of the logistics plate member 952. Because the bulge is provided on the outside of the trailer 20a, a smooth inner surface is provided within the trailer 20a. This allows for more width within the inside of the trailer 20a to load freight therein.

The flat top portion 970 and the flat bottom portion 972 of the splicing member 954 facilitate connection of the panels 942a, 942b to the top and bottom rails 38a, 40a of the trailer 20a. In order to connect the sidewalls 24a to the roof 30a, the roof 30a is laid on top of the edges of the sidewalls 24a. Each top rail 38a is connected by seating the first portion 39a against the roof 30a and the second portion 41a against the respective sidewalls 24a. The second portion 41a of each top rail 38a sits over the flat top portion 970 of each splicing member 954 provided along the length of the respective sidewalls 24a. Each bottom rail 40a connects the floor 32a and the respective sidewalls 24a in the same manner as each top rail 38a connects the roof 30a and the respective sidewalls 24a. The flat top portions 970 and the flat bottom portions 972 facilitate in the connection of the panels 942a, 942b to the top and bottom rails 38a, 40a of the trailer 20a because they allow the rails 38a, 40a, which have flat second portions 41a, to easily be positioned against the splicing member 954. If the splicing members 954 did not have the flat top and bottom portions 970, 972, but rather have the bulging intermediate portion 966 extending the entire height of each splicing member 954, the rails 38a, 40a would have to be formed to include bulges to fit over the bulging intermediate portion 966 of each splicing member 954. Thus, the use of the flat top and bottom portions 970, 972 on the splicing member 954 allows for a much easier connection between the splicing member 954 than if the flat top and bottom portions 970, 972 were not a part of the splicing member 954.

The logistics plate 952 and the splicing member 954 are attached to the first and second panels 942a, 942b by suitable means, such as rivets 968, which extend through the logistics plate 952, the respective coined sections 960a, 960b of the panels 942a, 942b, the respective core members 946a, 946b, the respective outer skins 950a, 950b, and the respective side portions 974 of the splicing member 954.

The splicing member 954 seals the junction between the panels 942a, 942b on the exterior of the trailer 20a so as to seal the interior from moisture. Moreover, because the flat top and bottom portions 970, 972 are seated under the top and bottom rails 38a, 40a, moisture does not penetrate into the interior of the trailer 20a and cause damage to the freight of the trailer 20a or to the trailer 20a itself.

In the first, second, third and ninth embodiments of the novel composite joint constructions 144, 244, 344, 944, to engage the rivets 168, 268, 368, 968 with the logistics plate 152, 252, 352, 952 the splicing member 154, 254, 354, 954 and the respective first and second panels 142a, 142b; 242a, 242b; 342a, 342b; 942a, 942b each rivet 168, 268, 368, 968 is engaged by using the method and apparatus disclosed in co-pending U.S. patent application Ser. No. 08/620,999, which disclosure has been incorporated by reference. Coining the ends of the panels 142a, 142b; 242a, 242b; 342a, 342b; 942a, 942b as described herein, condenses the plastic core member 146a, 146b; 246a, 246b; 346a, 346b; 946a, 946b sufficiently to support clamping force or pressure from the rivets 168, 268, 368, 968 without subsequent loosening. If desired, holes can be provided through the logistic panel 152, 252, 352, 952 and the splicing member 154, 254, 354, 954 through which the rivets 168, 268, 368, 968 are engaged.

In addition, in the first, second, third and ninth embodiments of the composite joint configurations 144, 244, 344, 944, it is envisioned that an insert, as discussed herein with respect to the fifth embodiment shown in FIG. 7, can be provided in the construction of these embodiments of the trailer sidewalls.

Attention is now directed to the tenth embodiment of the novel joint configuration 1044 shown in FIG. 16. In this embodiment, first and second composite panels 1042a, 1042b are joined together by a logistics plate 1052 on the inside of the trailer 20 which extends along the entire height of the panels 1042a, 1042b and the splicing member provided in the first, second, third and ninth embodiments has been eliminated.

At one end of the first panel 1042a, as shown in FIG. 16, the outer skin 1050a has a length that is substantially longer than the length of the inner skin 1048a. The end of the outer skin 1050a freely projects beyond the end of the core member 1046a and the inner skin 1048a. At the other end of the panel 1042a (not shown), the inner skin 1048a, the outer skin 1050a and the core member 1046a all extend the same length in an identical structure to the end of the second panel 1042b shown in FIG. 16.

At one end of the second panel 1042b, as shown in FIG. 16, the inner skin 1048b, the outer skin 1050b and the core member 1046b all extend the same length. At the opposite end of the second panel 1042b (not shown), the construction is identical to the end of the first panel 1042a shown in FIG. 16.

Each of the inner skins 1048a, 1048b of each panel 1042a, 1042b has an inner surface 1073a, 1073b. Each end of the inner skins 1048a, 1048b of each panel 1042a, 1042b has an end section 1074a, 1074b (only one of which is shown on each panel 1042a, 1042b) which includes a groove 1076a, 1076b formed therein proximate to, but spaced from, the end of the panels 1042a, 1042b. The remainder of the inner surfaces 1073a, 1073b of the inner skins 1048a, 1048b of the panels 1042a, 1042b remain planar. When the groove 1076a, 1076b is formed in the end section 1074a, 1074b of each inner skin 1048a, 1048b, the core member 1046a, 1046b is squeezed or compressed between the inner and outer skins 1048a, 1050a; 1048b, 1050b and the core member 1046a, 1046b may slightly extrude outwardly from the ends of the skins 1048a, 1050a; 1048b, 1050b and into the air pocket 1058 formed between the panels 1042a, 1042b. The grooves 1076a, 1076b may be formed by coining.

The logistics plate 1052 acts like a post and is a member having a flat intermediate portion 1078 with opposite edges 1080a, 1080b which are rolled. The logistics plate 1042 has an inner surface 1081 that is planar, except for the opposite edges 1080a, 1080b. A plurality of spaced openings or slots 1062 are provided through the flat intermediate portion 1078 of the logistics plate 1052. The slots 1062 provide a means for which equipment can be engaged, for example by a clip or a hook, to the sidewalls 24 of the trailer 20. The logistics plate 1052 is preferably formed from a heavier and stronger material than the material that is used for the skins 1048a, 1050a; 1048b, 1050b to provide the sidewall with strength and rigidity.

When the logistics plate 1052 is joined with the inner skins 1048a, 1048b of the panels 1042a, 1042b, the rolled edges 1080a, 1080b of the logistics plate 1052 sit within the respective grooves 1076a, 1076b in the end sections 1074a, 1074b, such that the opposite edges 1080a, 1080b are within substantially the same plane as the inner surfaces 1073a, 1073b of the inner skins 1048a, 1048b of each panel 1042a, 1042b, which is a different plane than the inner surface 1081 of the logistics plate 1052, and the flat intermediate portion 1078 spans the air pocket 1058 such that the slots 1062 align with the air pocket 1058 so that clips or hooks can be engaged with the slots 1062. The rolled edges 1080a, 1080b, when seated in the grooves 1076a, 1076b, provide a smooth transition from the logistics plate 1052 to the inner skins 1048a, 1048b to substantially prevent snagging of cargo on the edges of the logistics plate 1052. Rivets 1068 are engaged through the ends of the logistics plate 1052, the respective inner skins 1048a, 1048b, the respective core members 1046a, 1046b and the respective outer skins 1050a, 1050b.

The extension of the first panel outer skin 1050a eliminates the need for the separate splicing member as used in the first, second, third and ninth embodiments described herein. The outer skin 1050a is very thin, however, and, as such, does not provide as much reinforcement as the splicing member provides. The extension of the first panel outer skin 1050a seals the junction between the panels 1042a, 1042b on the exterior of the trailer 20 so as to seal the interior of the trailer 20 from moisture.

While preferred embodiments of the present invention are shown and described, it is envisioned that those skilled in the art may devise various modifications of the present invention without departing from the spirit and scope of the appended claims. For example, in any of the embodiments which uses a logistics plate, the logistics plate may be flat or bulge inwardly. Also, in any of the embodiments which uses a splicing member, the splicing member may be flat or bulge outwardly and may have the flat top and bottom portions if a bulge is provided. An insert could be provided in any of the embodiments or eliminated in the embodiments where it is shown.

The invention is claimed as follows:

1. A wall construction which is adapted for use in forming a wall in a trailer body comprising:

first and second panels, each said panel having opposite ends and comprising an inner skin, an outer skin and a core member between said inner skin and said outer skin, at least a portion of said ends being spaced apart from each other a predetermined distance to define a gap between said panels;

a member attached to said inner skin of at least one of said panels, said member having a plurality of slots therethrough for attachment of items to said wall, said slots being aligned with said gap; and means for joining said panels together along said outer skins formed by a portion of said outer skin of one of said panels overlapping said outer skin of the other of said panels, said overlapping portion of said outer skin being attached to said outer skin of said other of said panels.

2. A wall construction as defined in claim 1, wherein said inner and outer skins having inner surfaces and wherein said member has first and second end portions and an intermediate portion therebetween, said first end portion being attached to said inner surface of one of said skins of said panels, said second end portion being attached to said inner surface of one of said skins of said panels.

3. A wall construction as defined in claim 2, wherein said plurality of slots are provided through said intermediate portion.

4. A wall construction as defined in claim 2, wherein said intermediate portion of said member bulges away from said inner skins of said first and second panels.

5. A wall construction as defined in claim 2, wherein said member is attached to each said panel by rivets.

6. A wall construction as defined in claim 2, wherein said first end portion of said member attaches to said inner surfaces of said inner and outer skins of said first panel.

7. A wall construction as defined in claim 2, wherein said second end portion of said member attaches to said inner surfaces of said inner and outer skins of said second panel.

8. A wall construction as defined in claim 2, wherein said first end portion of said member is attached to said inner surface of said inner skin of said first panel and to said inner surface of said outer skin of said second panel.

9. A wall construction as defined in claim 2, wherein said second end portion of said member attaches to said inner surface of said inner skin of said second panel and to said inner surface of said outer skin of said second panel.

10. A wall construction as defined in claim 2, further including at least one insert which is attached to said inner surface of said outer skin of said first panel and to said first end portion of said member.

11. A wall construction as defined in claim 1, wherein said outer skin of said first panel at said end of said first panel extends beyond an end of said core member of said first panel, and wherein said outer skin of said second panel at said end of said second panel extends beyond an end of said core member of said second panel.

12. A wall construction as defined in claim 11, wherein said outer skin of said first panel at said end of said first panel extends beyond said inner skin of said first panel at said end of said first panel, said outer skin of said first panel lying against said outer skin of said second panel.

13. A wall construction as defined in claim 11, wherein an inner surface of said outer skin of said first panel lies against an outer surface of said outer skin of said second panel.

14. A wall construction as defined in claim 11, wherein an outer surface of said outer skin of said first panel lies against an inner surface of said outer skin of said second panel.

15. A wall construction as defined in claim 11, wherein said outer skin of said second panel at said end of said second panel extends beyond said inner skin of said second panel at said end of said second panel.

16. A wall construction as defined in claim 1, wherein said inner skins of said panels are formed of metal.

17. A wall construction as defined in claim 1, wherein said outer skins of said panels are formed of metal.

18. A wall construction as defined in claim 1, wherein said core member is at least partially formed of plastic.

* * * * *